US008645699B2

(12) United States Patent
Wood et al.

(10) Patent No.: US 8,645,699 B2
(45) Date of Patent: Feb. 4, 2014

(54) USE OF CERTIFICATE AUTHORITY TO CONTROL A DEVICE'S ACCESS TO SERVICES

(75) Inventors: Robert Henderson Wood, Waterloo (CA); Roger Paul Bowman, Waterloo (CA); Christopher Lyle Bender, Waterloo (CA); Ian Michael Robertson, Waterloo (CA); Casey Jonathan Vandeputte, Waterloo (CA)

(73) Assignee: BlackBerry Limited, Waterloo (CA)

( * ) Notice: Subject to any disclaimer, the term of this patent is extended or adjusted under 35 U.S.C. 154(b) by 555 days.

(21) Appl. No.: 12/723,926

(22) Filed: Mar. 15, 2010

(65) Prior Publication Data

US 2011/0225427 A1 Sep. 15, 2011

(51) Int. Cl.
*H04L 9/32* (2006.01)

(52) U.S. Cl.
USPC ........... 713/176; 713/175; 713/168; 713/156; 455/411; 380/30; 380/44

(58) Field of Classification Search
USPC .......... 713/175–176, 168, 156, 180; 455/411; 380/30, 44
See application file for complete search history.

(56) References Cited

U.S. PATENT DOCUMENTS

| 6,772,331 | B1 * | 8/2004 | Hind et al. | 713/151 |
| 6,871,276 | B1 * | 3/2005 | Simon | 713/156 |
| 6,886,095 | B1 * | 4/2005 | Hind et al. | 713/168 |
| 6,980,660 | B1 * | 12/2005 | Hind et al. | 380/282 |
| 7,103,778 | B2 * | 9/2006 | Kon et al. | 713/185 |
| 7,653,815 | B2 * | 1/2010 | Godfrey et al. | 713/176 |
| 7,694,155 | B2 * | 4/2010 | Harada et al. | 713/193 |
| 7,698,571 | B2 * | 4/2010 | Harada et al. | 713/193 |
| 7,827,406 | B2 * | 11/2010 | Brown et al. | 713/170 |
| 8,041,338 | B2 * | 10/2011 | Chen et al. | 455/407 |
| 8,108,921 | B2 * | 1/2012 | Shin et al. | 726/8 |
| 8,171,292 | B2 * | 5/2012 | Brown et al. | 713/171 |
| 8,201,232 | B2 * | 6/2012 | Zhang et al. | 726/7 |
| 8,205,084 | B2 * | 6/2012 | Godfrey et al. | 713/170 |
| 8,214,645 | B2 * | 7/2012 | Brown et al. | 713/171 |
| 8,352,743 | B2 * | 1/2013 | Tsuruoka et al. | 713/176 |
| 8,447,980 | B2 * | 5/2013 | Godfrey et al. | 713/170 |
| 8,464,062 | B2 * | 6/2013 | Brown et al. | 713/171 |
| 2003/0007640 | A1 * | 1/2003 | Harada et al. | 380/270 |

(Continued)

OTHER PUBLICATIONS

Horn, et al; Authentication protocols for mobile network environment value-added services; vol. 51 , Issue: 2 Publication Year: 2002 , pp. 383-392.*

(Continued)

*Primary Examiner* — Luu Pham
*Assistant Examiner* — Angela Holmes
(74) *Attorney, Agent, or Firm* — Ridout & Maybee LLP

(57) ABSTRACT

A mobile communications device having a digital certificate authenticating the device itself is proposed. A server for authenticating the device and a method of authenticating the device are also disclosed. The device comprises a transmitter, a processor, a memory and a computer readable medium. The memory includes a certificate certifying the authenticity of the mobile communications device, the certificate comprising device-specific data and a digital signature signed by an authority having control of the authenticity of the mobile communications device. The computer readable medium has computer readable instructions stored thereon that when executed configure the processor to instruct the transmitter to transmit a copy of the certificate to a service provider in response to a request to authenticate the mobile communications device with the service provider.

18 Claims, 6 Drawing Sheets

(56) References Cited

U.S. PATENT DOCUMENTS

| | | | |
|---|---|---|---|
| 2004/0196978 A1* | 10/2004 | Godfrey et al. | 380/270 |
| 2005/0066164 A1 | 3/2005 | Simon | |
| 2005/0086468 A1* | 4/2005 | Meandzija et al. | 713/156 |
| 2005/0163320 A1* | 7/2005 | Brown et al. | 380/270 |
| 2005/0277420 A1* | 12/2005 | Shin et al. | 455/442 |
| 2007/0083772 A1* | 4/2007 | Harada et al. | 713/193 |
| 2007/0265984 A1* | 11/2007 | Santhana | 705/65 |
| 2008/0108322 A1* | 5/2008 | Upp | 455/411 |
| 2008/0148044 A1* | 6/2008 | Upp et al. | 713/156 |
| 2008/0182592 A1* | 7/2008 | Cha et al. | 455/456.3 |
| 2008/0208688 A1* | 8/2008 | Byerley et al. | 705/14 |
| 2009/0068982 A1* | 3/2009 | Chen et al. | 455/407 |
| 2009/0328141 A1* | 12/2009 | Zhang et al. | 726/2 |
| 2010/0088519 A1* | 4/2010 | Tsuruoka et al. | 713/176 |
| 2010/0115264 A1* | 5/2010 | Godfrey et al. | 713/153 |
| 2010/0124333 A1* | 5/2010 | Godfrey et al. | 380/270 |
| 2010/0262828 A1* | 10/2010 | Brown et al. | 713/171 |
| 2010/0262829 A1* | 10/2010 | Brown et al. | 713/171 |
| 2010/0325427 A1* | 12/2010 | Ekberg et al. | 713/156 |
| 2012/0198236 A1* | 8/2012 | Brown et al. | 713/171 |
| 2012/0246706 A1* | 9/2012 | Brown et al. | 726/5 |
| 2012/0317224 A1* | 12/2012 | Caldwell et al. | 709/217 |
| 2013/0078946 A1* | 3/2013 | Pecen et al. | 455/411 |
| 2013/0078947 A1* | 3/2013 | Pecen et al. | 455/411 |
| 2013/0078948 A1* | 3/2013 | Pecen et al. | 455/411 |
| 2013/0078949 A1* | 3/2013 | Pecen et al. | 455/411 |
| 2013/0246794 A1* | 9/2013 | Brown et al. | 713/171 |

OTHER PUBLICATIONS

Scheuermann, D. et al. ; The smartcard as a mobile security device ; vol. 14 , Issue: 5 Publication Year: 2002.*

Tang, Jian, et al.; Distributed PIN Verification Scheme for Improving Security of Mobile Devices; Apr. 2003 ; Mobile Networks and Applications , vol. 8 Issue 2.*

Extended European Search Report on corresponding European Patent Application No. 10156524.0 dated Oct. 9, 2010; 7 pages.

Lee, Yun-Kyung et al; "Home Network Device Authentication: Device Authentication Framework and Device Certificate Profile"; Computer Journal Published for the British Computer Society by Oxford University Press UK; vol. 52; No. 8; Jul. 24, 2008; pp. 871-877; XP002607048; http://comjnl.oxfordjournals.org/content/52/8/871; obtained online Oct. 26, 2010.

SSL Certificates, website of VeriSign, Inc., accessed Mar. 12, 2010, available at http://www.verisign.com/ssl/index.html?sl-hppd.

* cited by examiner

USE OF CERTIFICATE AUTHORITY TO CONTROL A DEVICE'S ACCESS TO SERVICES

TECHNICAL FIELD

The present disclosure relates generally to control of a mobile communication device's access to services.

BACKGROUND

Service providers of mobile communication services and 3rd party vendors of mobile communication devices currently do not have a means to identify if mobile communication devices accessing their networks and applications have legitimate access rights. For example, a service provider operator, such as a provider of email or messaging services or a wireless carrier, may decide that they only want devices manufactured in certain geographies to be allowed to connect to their system.

This desire to authenticate mobile communications devices is partly driven by the fact that providers of mobile communication devices often outsource the manufacturing of the devices to outside agencies, thus losing some control over the integrity and security of the devices. For example, there have been cases where a third party manufacturer had installed wireless modems in credit card readers without the knowledge of the provider of the readers or the end user being aware. Similar infractions can occur in the manufacturing of any type of device, including mobile communications devices. Not only does this type of breach of trust affect the security of the information processed by the devices and networks processing the information provided by the devices, it affects the trust that customers and service providers have in the devices.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
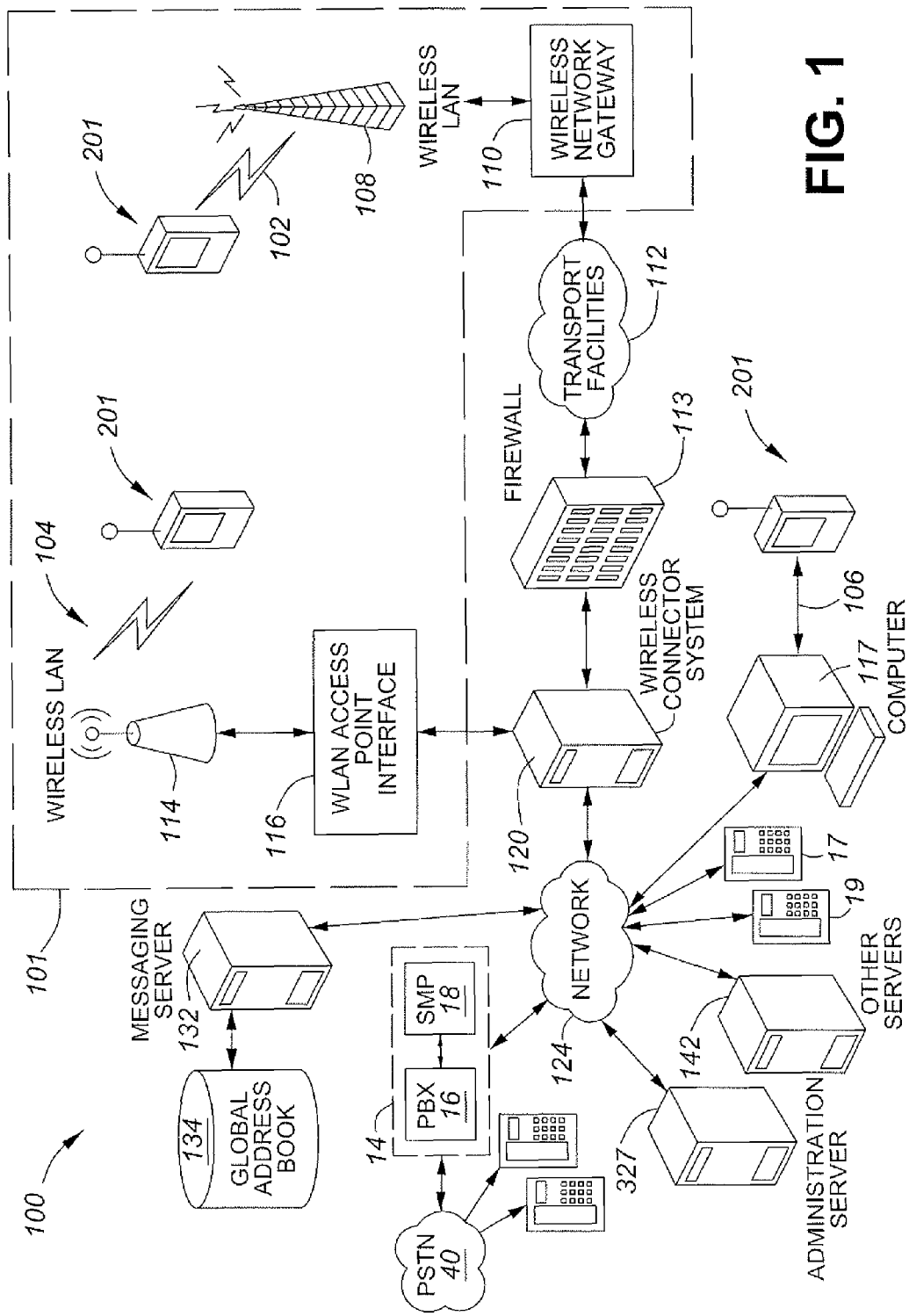
FIG. 1 is a block diagram illustrating a communication system including a mobile communication device in which example embodiments of the present disclosure can be applied.

To provide a mechanism for service providers to authenticate mobile communications devices, the present application proposes to install a digital certificate on each mobile communication device at the manufacturing stage. The digital certificate comprises a digital signature of an authority. In existing authentication methods used for wireless services, it is typically the user that is authenticated. For example by providing a user defined password. Some wireless carriers authenticate removable SIM (Subscriber Identity Module) cards that are installed on mobile communication devices. As described herein, the installation of the digital certificate on the mobile communication device enables the authenticity of the device itself to be verified, rather than the user or an exchangeable component.

In an embodiment, the digital signature is applied to device-specific data using a private encryption key maintained by the authority and can be authenticated using a corresponding public encryption key. Examples of device-specific data include, but are not limited to, device identity and device manufacturing heritage. The device-specific data together with the digital signature make up the digital certificate. The certificate with the digital signature can be installed, in some embodiments, by the manufacturer. In these embodiments, the manufacturer is trusted by the authority to maintain control of the private key. In other embodiments, the certificate is installed at a testing facility after the mobile communications device is manufactured. In still other embodiments, the certificate is installed by a producer of the mobile communications device before shipping the device to a customer, such as a user or a service provider. These and other embodiments will be discussed in detail below.

Thus, in first aspect, there is provided a mobile communications device comprising: a transmitter; a processor; a memory including a certificate certifying the authenticity of the mobile communications device, the certificate including device-specific data and a digital signature signed by an authority having control of the authenticity of the mobile communications device; and a computer readable medium having computer readable instructions stored thereon that when executed configure the processor to instruct the transmitter to transmit a copy of the certificate to a service provider in response to a request to authenticate the mobile communications device with the service provider.

In a second aspect, there is provided a method authenticating a mobile communications device with a service provider, the method comprising: the mobile communications device receiving a request to authenticate the mobile communications device with the service provider; and the mobile communications device transmitting a copy of a certificate certifying the authenticity of the mobile communications device to the service provider in response to the request, the certificate being stored in memory on the mobile communications device and including device-specific data and a digital signature of an authority having control of the authenticity of the mobile communications device.

In a third aspect, there is provided a server configured to authenticate mobile communication devices attempting to access services of a service provider, the server comprising: a receiver for receiving a copy of a certificate stored on a mobile communications device attempting to access a service of the service provider, the certificate certifying the authenticity of the mobile communications device and including device-specific data and a digital signature of an authority having control of the authenticity of the mobile communications device; a transmitter; a processor; and a memory storing computer readable instructions that when executed configure the processor to make a determination of whether or not the digital signature on the certificate is authentic in response to receiving the certificate and if the digital signature is determined to be authentic, causing the transmitter to transmit an indication that the mobile communications device is authentic to a sender of the copy.

Embodiments of the present application are not limited to any particular operating system, mobile device architecture, server architecture, or computer programming language.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120, may be operated by a mobile network provider. In some embodiments, the network 124 may be realised using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as Internet content or content from an organization's internal servers to the mobile communication devices 201 in the wireless network 101, and an application server for implementing server-based applications.

The global address book 134 comprises electronic contact records created and maintained by an IT (information technology) administrator of the network 124. Typically, the global address book is maintained exclusively by the messaging server 132 and there is no local copy on the mobile device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 132 or application servers 136. Conversely, the wireless connector system 120 sends data packets received, for example, from the messaging server 132 or other server 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 132 and application server 136.

The network 124 may comprise a private local area network, metropolitan area network, wide area network, the public Internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some embodiments, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
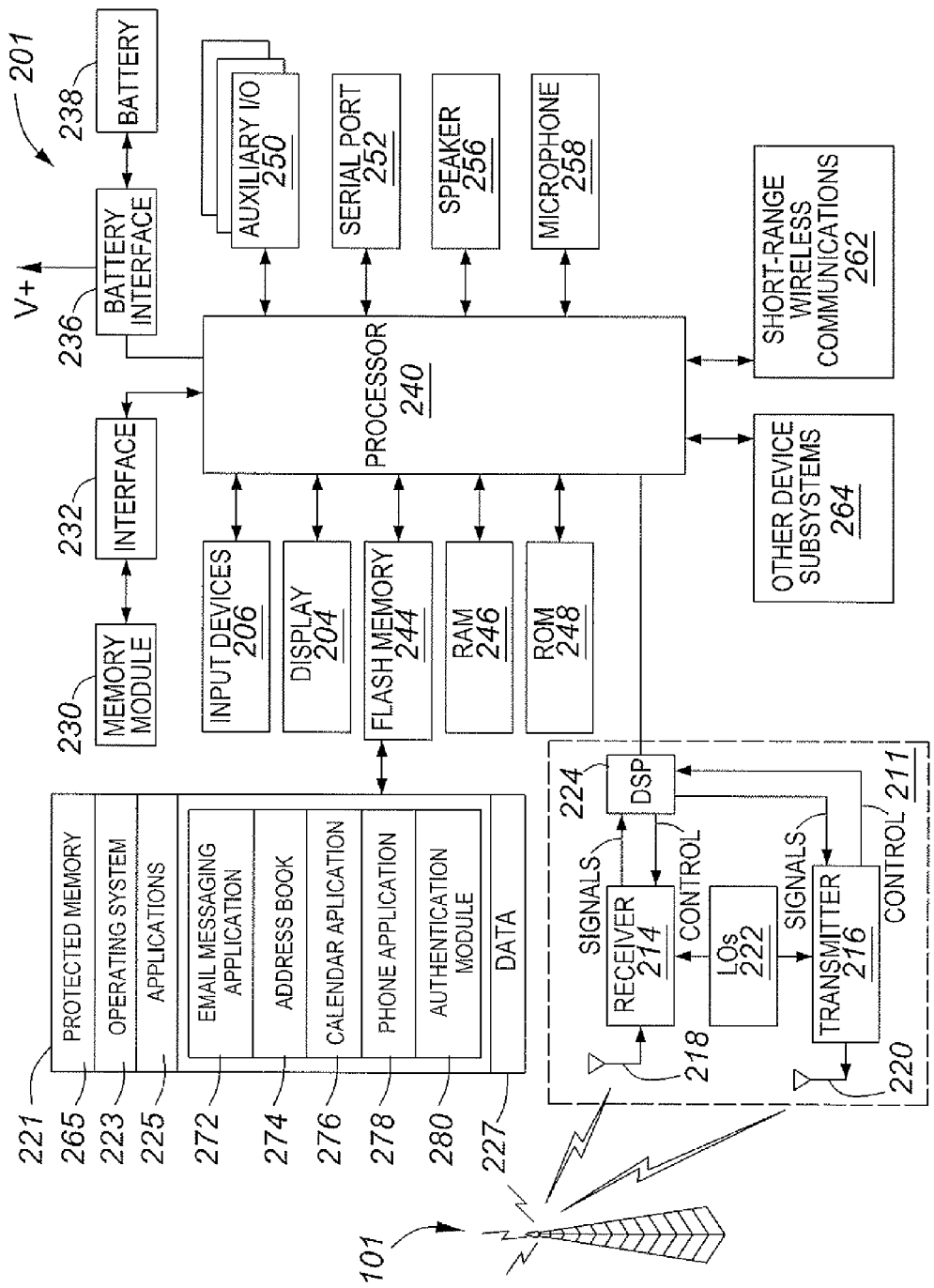
FIG. 2 is a block diagram illustrating a mobile communication device in accordance with one example embodiment of the present disclosure.

Reference is now made to FIG. 2 which illustrates an exemplary embodiment of the mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and an authentication module 280. Example embodiments of the authentication module 280 will be discussed in detail later herein. It is recognized that the authentication module 280 and its various components as described herein can form a discrete module running on the device 201, or the functions of the authentication module 280 can be distributed on the device 201 as separate modules or integrated within other existing modules as desired. Such discrete or distributed implementations all fall within the embodiments of the authentication module 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

Public and private encryption keys are used in secure messaging protocols such as S/MIME and PGP-based protocols to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information is shared.

Public and private encryption keys are also used to sign a message using a digital signature. A digital signature generally comprises a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the signer's private key should be able to encode a signature that the recipient will decode correctly using the signer's public key. Therefore, by verifying a digital signature in this way, authentication of the signer and message integrity can be maintained.

An encoded message may be encrypted, signed, or both encrypted and signed. "Signed and/or encrypted" means signed or encrypted or both. In S/MIME, the authenticity of public keys used in these operations is validated using certificates. A certificate is a digital document issued by a certificate authority (CA). Certificates may be used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

Some wireless carriers use IMEI (International Mobile Equipment Identity) numbers to block stolen mobile communication devices from accessing their respective network. The reporting system for this service is optional and the database is typically only accessible by wireless carriers and not accessible by other service providers. IMEI has, as a result, not been an effective means for ensuring the authenticity of the mobile communications devices accessing services provided by various service providers.

In the present application, certificates are used to verify the authenticity of a mobile communication device. A certificate with a digital signature of an authority, such as the manufacturer or the service provider, is installed in the device before providing the device to an end user. The certificate can be installed in a memory or can be securely bound to the device by storing a hash code of the certificate in a OTP (One Time Programmable) memory within one or more components of the device. Using the OTP memory within hardware of the device makes the certificate more secure by making it more expensive to change since it would require replacing at least one hardware component. The digital signature of the authority on the certificate can be verified, thus vouching for the authenticity of the mobile communication device.

In some embodiments, the certificate is a data packet that contains information related to the mobile communications device and a digital signature of the authority. Non-limiting examples of the information that can be in the data packet are a serial number, IMEI, PIN (Personal Identification Number), MAC (Media Access Control) address, CPU ID (Central Processing Unit Identifier), the location where the device was built, when the device was built, the manufacturer of the device and the carrier on which the device is authorized for use. Alternatively, the certificate comprises an identifier for the mobile communications device and the digital signature and any other related information is maintained in a database accessible by a server responsible for verifying the authenticity of the device.

In an exemplary implementation, a mobile communication device designed and sold by a producer is manufactured by a third party. The producer in this embodiment is the authority. In some embodiments, the producer controls a private encryption key used for applying the digital signature the certificates.

Figure 3:
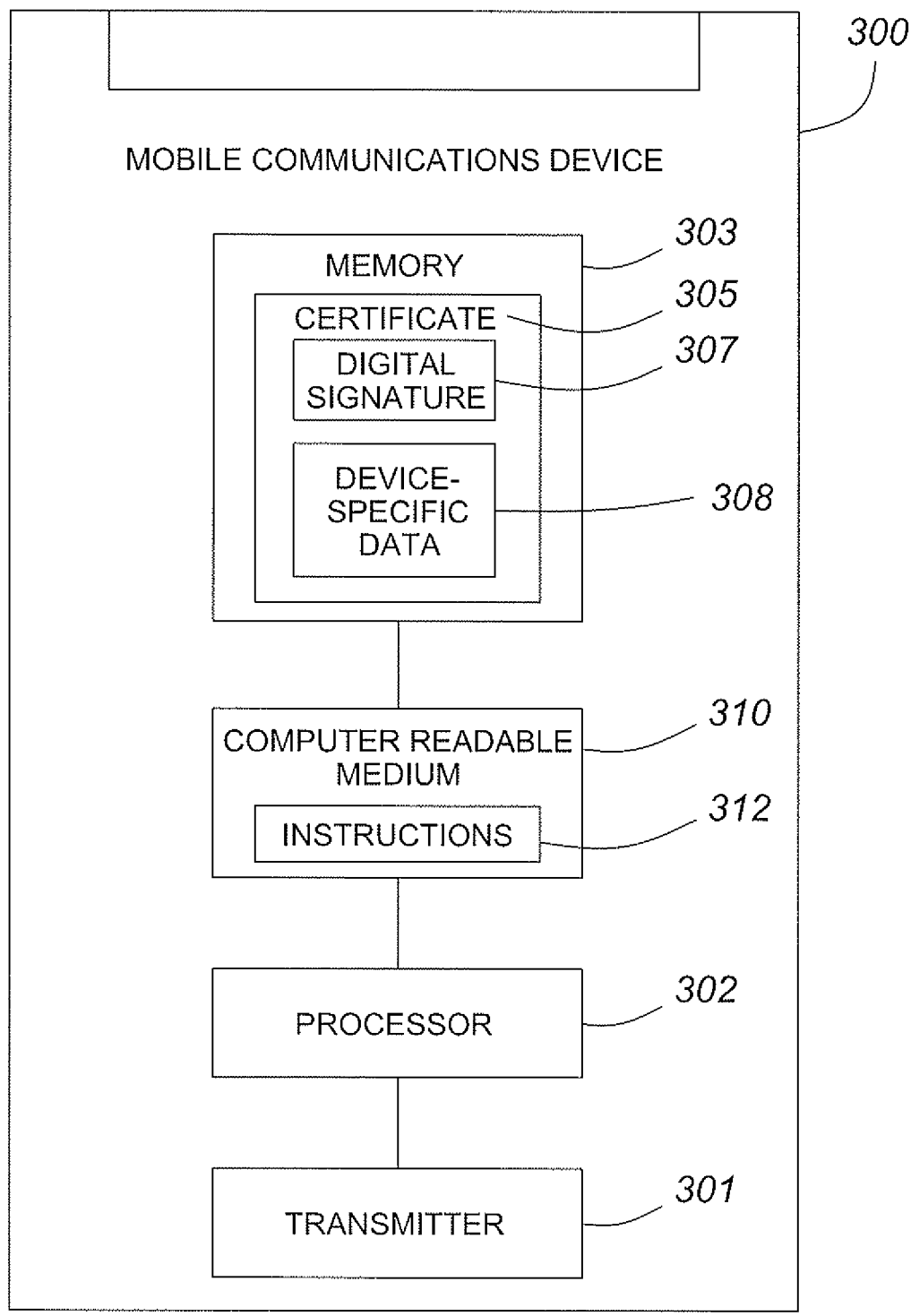
FIG. 3 is a block diagram illustrating a mobile communication device in accordance with one example embodiment of the present disclosure.

Referring now to FIG. 3, an exemplary embodiment of a mobile communication device 300 will now be discussed. The mobile communications device 300 comprises: a transmitter 301; a processor 302; a memory 303 and an authentication module 310. The memory 303 comprises a certificate 305 certifying the authenticity of the mobile communications device 300. The certificate 305 has a digital signature 307 signed by an authority having control of the authenticity of the mobile communications device and device-specific data 308. Non-limiting examples of device-specific data 308 include a serial number, IMEI, PIN, MAC address, CPU ID, the location where the device was built, when the device was built, the manufacturer of the device and the carrier on which the device is authorized for use. The computer readable medium 310 has computer readable instructions 312 stored thereon that when executed configure the processor 302 to instruct the transmitter 301 to transmit a copy of the certificate 305 to the service provider in response to a request to authenticate the mobile communications device 300 with the service provider. Mobile device 201 described with reference to FIGS. 1 and 2 is a non-limiting example of mobile communications device 300.

The authority that signs the certificate 305 in some cases is the manufacturer of the mobile communications device 300. In other implementations, the authority is a testing organization that tested the mobile device after it was manufactured. In other implementations the authority is the producer of the mobile device. In the case where manufacturing is outsourced, the producer is different from the manufacturer. In still other embodiments, the authority is a certification authority given responsibility for installing the certificates by the producer.

The digital signature 307 is any verifiable secure digital mark that is identifiable with the authority. In some embodiments, the digital signature 307 is applied to the certificate using a private encryption key. In some such cases, the validity of the certificate is verified using a corresponding public encryption key. The corresponding public encryption key can be distributed to services providers by the authority. It is to be understood that any encryption method or other verifiable secure signing means may be used to apply the digital signature to the certificate.

The certificate 305, in some embodiments, is installed in the memory 303 while the mobile device 300 is being manufactured. In other embodiments, the certificate 305 is installed during testing of the mobile device 300. In still other embodiments, the certificate 305 is installed before delivery of the mobile communications device 300 to a customer. In some embodiments, the certificate is installed in one of the hardware components of the device, such as the CPU, before the component is delivered to the manufacturer of the device. Non-limiting examples of a customer are a distributor, a service provider, and an end user. A service provider can include but is not limited to a wireless carrier, a messaging service provider, an enterprise service provider, an Internet service provider, a website, and an online financial institution (such as a bank or credit card company) or combinations thereof.

In some embodiments, the processor 302 is configured to cause the copy to be transmitted to a server controlled by the service provider. In some implementations it is this server that determines the validity of the certificate. In other implementations, this server forwards a request to determine the validity of the certificate to a central organization that maintains information related to certificates signed by the authority. In some implementations the central organization is the authority. Other examples of a central organization are the producer of the mobile communication device and a third party organization entrusted with responsibility for validating certificates of mobile communication devices.

In some embodiments, a stronger authentication mechanism is used, whereby the mobile communications device is cryptographically challenged by the service provider using a public key contained in its certificate. A private key within the device (not written plaintext in the certificate) is used by the device to generate a response to the challenge. The private key can be protected in some further way, such as but not limited to locked in hardware or a user supplied password.

In an exemplary embodiment, the certificate 305 comprises at least one of a unique identifier for the mobile communications device, a location where the mobile communications device 300 was built, and a carrier on which the mobile communications device 300 is authorized to operate. As mentioned above, alternative embodiments employ certificates comprising an identifier for the respective mobile communications device and the digital signature, with any other related information being maintained in a database accessible by a server responsible for verifying the authenticity of the device.

The computer readable medium 310 can be implemented using software, hardware or combinations thereof. Authentication module 280 shown in FIG. 2 is one example.

In some embodiments, the processor 302 is configured to cause the copy of the certificate 305 to be transmitted in response to a challenge from the service provider. In still further embodiments, the processor 302 is further configured to encrypt the certificate prior to transmitting the certificate to the service provider. Any encryption method, including but not limited to private/public encryption key pairs may be used to encrypt the copy of the certificate 305.

Exemplary embodiments of the memory 303 include, but are not limited to, a read only memory (ROM), a flash memory, and a random access memory (RAM).

In a further embodiment, the mobile communications device 300 further comprises a receiver and the processor 302 is further configured to receive through the receiver from the service provider at least one of an indication that the certificate is valid and an indication that the certificate is not valid. In some embodiments, a server of the service provider sends a message to the mobile device with the indication of whether or not the certificate is valid. In some embodiments, the indication that the certificate is valid is the granting of access to a service provided by the service provider. In some embodiments, the indication that the certificate is invalid is a denial of access to a service provided by the service provider.

In some embodiments, the mobile communications device 300 further comprising a user interface, through which a request to access a service offered by the service provider is received, the service only being available to mobile communications devices that have been authenticated.

The processor 302 may also be configured to disable the mobile communications device 300 if an attempt to alter the certificate 305 without using the private key of the authority is detected.

Figure 4:
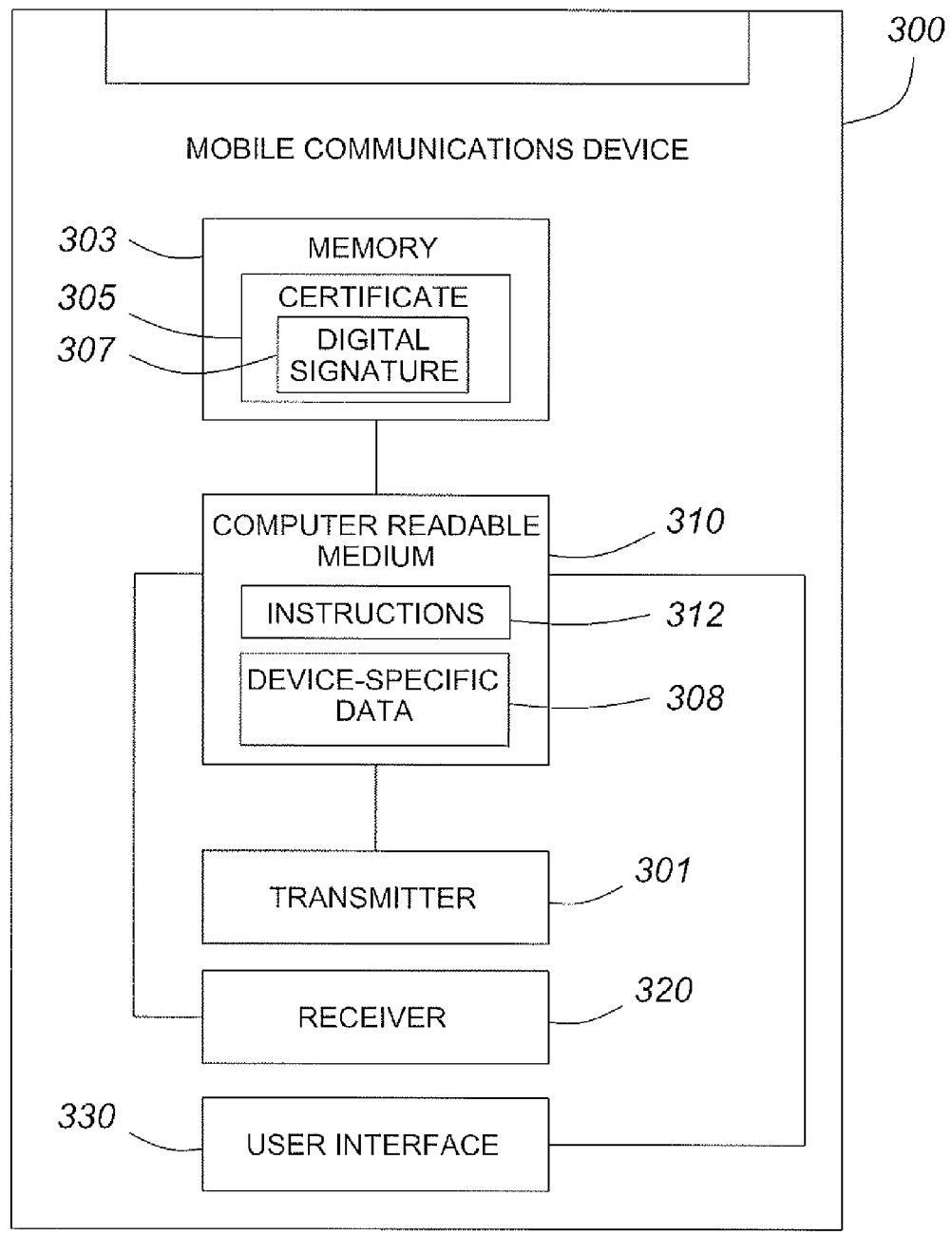
FIG. 4 is a block diagram illustrating a mobile communication device in accordance with one example embodiment of the present disclosure.

FIG. 4 depicts an embodiment of the mobile communications device 300 in which a receiver 320 and a user interface 330 are shown. Other than these two added features, the components of the mobile communications device 300 of FIG. 4 are the same as that shown in FIG. 3.

Figure 5:
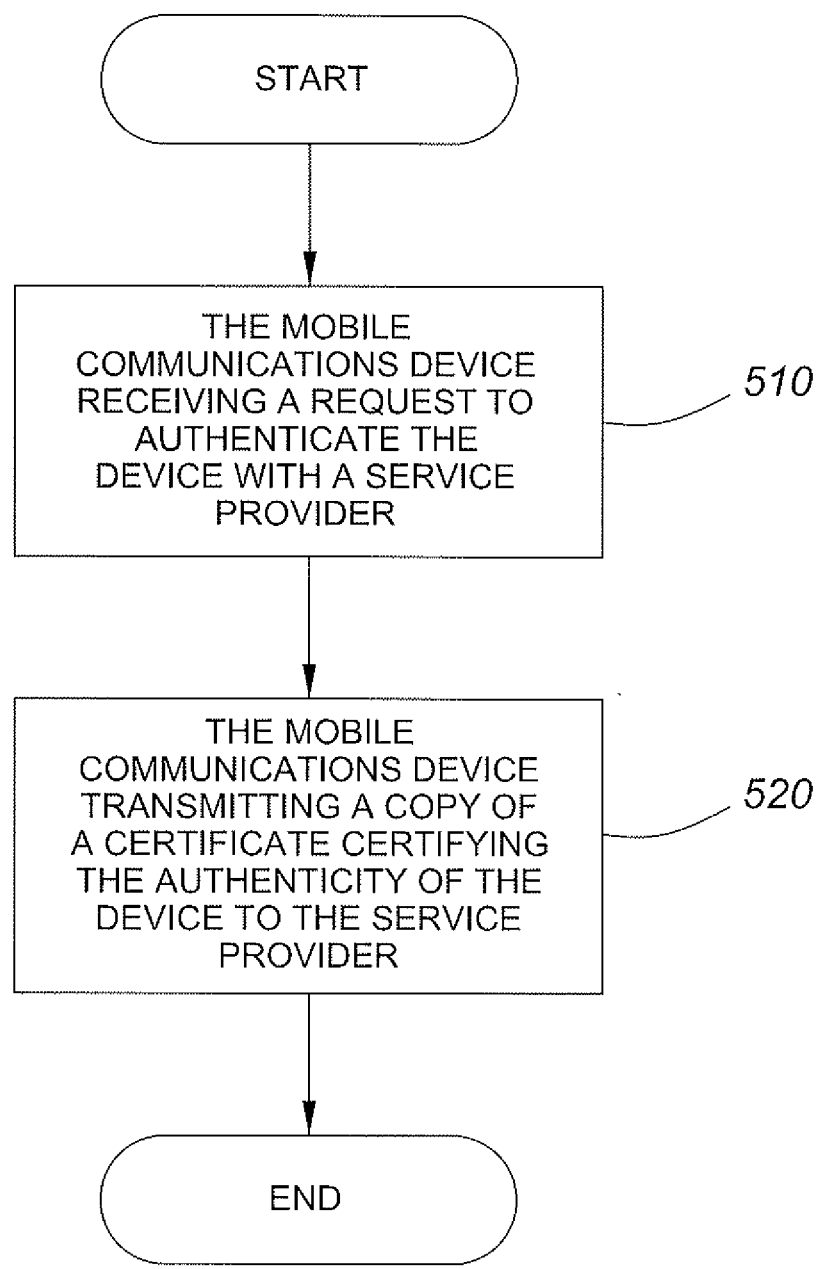
FIG. 5 is a flow chart of a method in accordance with one example embodiment of the present disclosure.

Referring now to FIG. 5, a method authenticating a mobile communications device with a service provider will now be described. The method is for implementation on a mobile communications device, such as but not limited to mobile device 201 or mobile communications device 300 described herein.

At step 510, the method starts with the mobile communications device receiving a request to authenticate the mobile communications device with the service provider. Then at step 520, the mobile communications device transmits a copy of a certificate certifying the authenticity of the mobile communications device to the service provider in response to the request, the certificate being stored in memory on the mobile communications device and comprising a digital signature of an authority having control of the authenticity of the mobile communications device.

In some embodiments, receiving the request comprises receiving a challenge from the service provider. In other embodiments, the request is received from a user of the mobile communications device through a user interface on the mobile communications device.

In an exemplary implementation, the method further comprises receiving, from the service provider, at least one of an indication that the certificate is valid and an indication that the certificate is invalid. Various implementations of such indications are described above with reference to FIG. 3.

Figure 6:
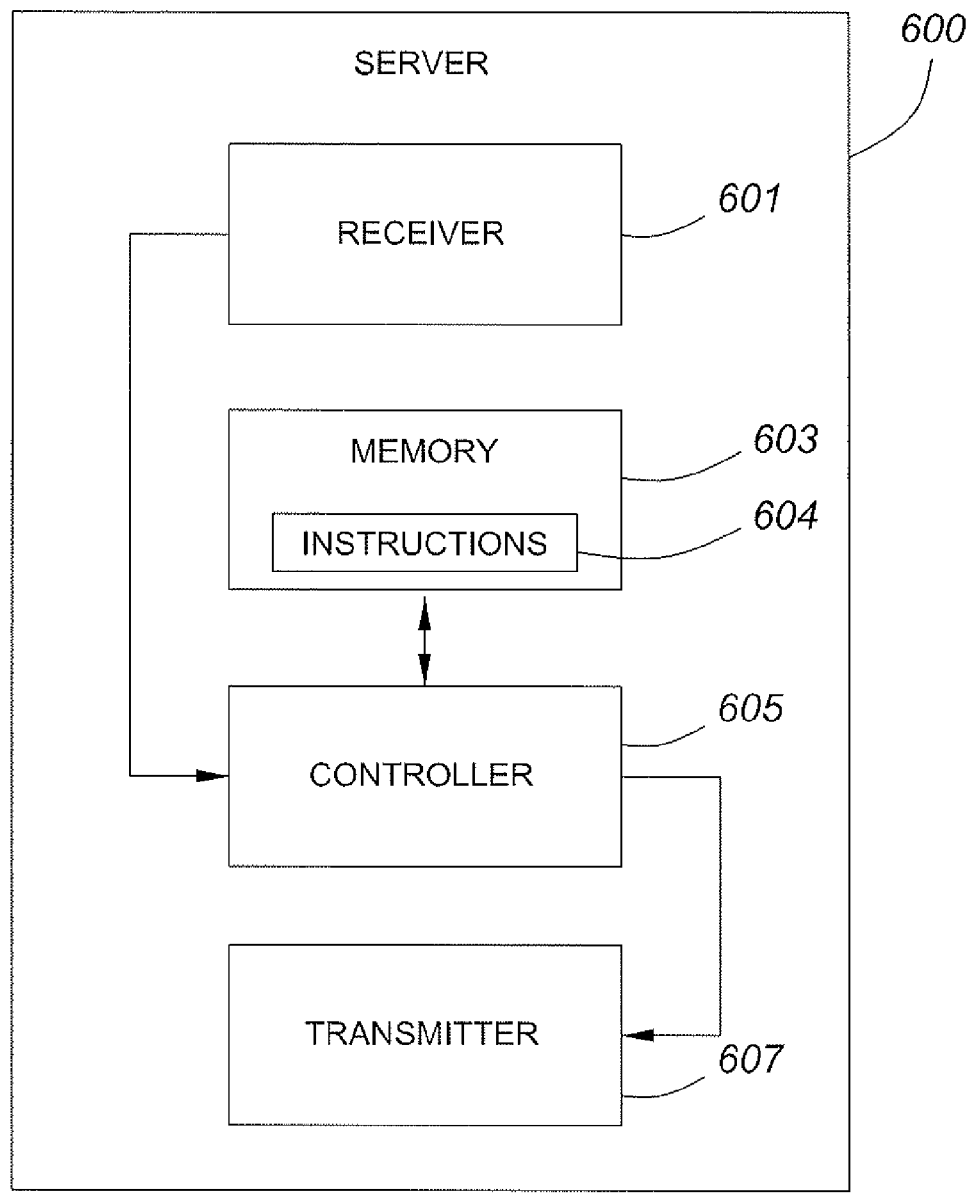
FIG. 6 is a block diagram illustrating a server in accordance with one example embodiment of the present disclosure.

A server 600 will now be described with reference to FIG. 6. The server 600 is configured to authenticate mobile communication devices attempting to access services of a service provider. The server 600 comprises a receiver 601, a memory 603, a processor 605 and a transmitter 607. The receiver 601 is for receiving a copy of a certificate stored on a mobile communications device attempting to access a service of the service provider, the certificate certifying the authenticity of a mobile communications device and comprising a digital signature of an authority having control of the authenticity of the mobile communications device. The memory 603 stores computer readable instructions 604 that when executed configure the processor to make a determination of whether or not the digital signature on the certificate is authentic. The processor 605 implements the instructions in response to receiving the certificate and if the digital signature is determined to be authentic, causes the transmitter 607 to transmit an indication that the mobile communications device is authentic to a sender of the copy.

In some embodiments, the sender of the copy to the server is the mobile communications device on which the certificate is stored. In other embodiments, the copy of the certificate is received from a network element of the service provider and the processor causes the transmitter to transmit the indication the mobile device is authentic to the network element. A non-limiting example of a network element is a server. For example, the mobile communications device in some implementations sends the copy of the certificate to a server of the service provider which in turn forwards the copy to the server 600, which is responsible for authenticating the mobile device.

In an exemplary embodiment, the memory 603 comprises a public encryption key corresponding to a private encryption key used to generate the digital signature and the instructions 604 implemented by the processor 605 use the public key to determine if the digital signature is authentic.

In some embodiments, the processor 605 is further configured to cause the transmitter 607 to transmit an indication that the mobile communications device is not authentic if the digital signature is determined to be invalid.

The server 600 in some implementations comprises a database of information related to a list of mobile communications devices, the information comprising an indication of whether or not each mobile communications device listed is authorized to access a respective service.

Non-limiting examples of the server 600 include at least one of a content server, applications server and a messaging server.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A mobile communications device comprising:
   a transmitter;
   a processor;
   a receiver;
   a memory including a certificate certifying the authenticity of the mobile communications device, the certificate including device-specific data, a unique identifier for the mobile communications device, information of a location where the mobile communications device was built, and a digital signature signed by an authority having control of the authenticity of the mobile communications device; and
   a computer readable medium having computer readable instructions stored thereon that when executed configure the processor to instruct the transmitter to transmit a copy of the certificate to a service provider in response to a request to authenticate the mobile communications device with the service provider and to receive through the receiver a response from the service provider including an indication that the certificate and location are valid or an indication that the certificate and location are not valid.

2. The mobile device of claim 1, wherein the digital signature is signed by the authority using a private key and is verifiable using a corresponding public key.

3. The mobile communications device of claim 1, wherein the processor is configured to cause the copy of the certificate to be transmitted in response to a challenge from the service provider.

4. The mobile communications device of claim 1, wherein the processor is further configured to encrypt the certificate prior to transmitting the certificate to the service provider.

5. The mobile communications device of claim 1, further comprising a user interface, through which a request to access a service offered by the service provider is received, the service only being available to mobile communications devices that have been authenticated.

6. The mobile communications device of claim 1, wherein the processor is further configured to cause the copy to be transmitted to a server controlled by the service provider.

7. The mobile communications device of claim 1, wherein the certificate comprises a carrier on which the mobile communications device is authorized to operate.

8. The mobile communications device of claim 1, wherein the processor is further configured to disable the mobile communications device if an attempt to alter the certificate without using the private key of the authority is detected.

9. The mobile communications device of claim 1, wherein the memory is at least one of a read only memory (ROM), a flash memory, and a random access memory (RAM).

10. A method of authenticating a mobile communications device with a service provider, the method comprising:
    the mobile communications device receiving a request to authenticate the mobile communications device with the service provider;
    the mobile communications device transmitting a copy of a certificate certifying the authenticity of the mobile communications device to the service provider in response to the request, the certificate being stored in memory on the mobile communications device and including device-specific data, a unique identifier for the mobile communications device, information of a location where the mobile communications device was built and a digital signature of an authority having control of the authenticity of the mobile communications device; and
    the mobile communications device receiving a response from the service provider including an indication that the certificate and location are valid or an indication that the certificate and location are not valid.

11. The method of claim 10, wherein receiving the request comprises receiving a challenge from the service provider.

12. A server configured to authenticate mobile communication devices attempting to access services of a service provider, the server comprising:
    a receiver for receiving a copy of a certificate stored on a mobile communications device attempting to access a service of the service provider, the certificate certifying the authenticity of the mobile communications device and including device-specific data, a unique identifier for the mobile communications device, information of a location where the mobile communications device was built and a digital signature of an authority having control of the authenticity of the mobile communications device;
    a transmitter;
    a processor; and
    a memory storing computer readable instructions that when executed configure the processor to make a determination of whether or not the digital signature on the certificate is authentic in response to receiving the certificate and if the digital signature is determined to be authentic and the location is determined to be valid, causing the transmitter to transmit an indication that the mobile communications device is authentic and valid to a sender of the copy.

13. The server of claim 12, wherein the memory comprises a public key corresponding to a private key used to generate the digital signature and the processor is configured to use the public key to determine if the digital signature is authentic.

14. The server of claim 12, wherein the processor is further configured to cause the transmitter to transmit an indication that the mobile communications device is not authentic if the digital signature or location is determined to be invalid.

15. The server of claim 12, comprising a database of information related to a list of mobile communications devices, the information comprising an indication of whether or not each mobile communications device listed is authorized to access a respective service.

16. The server of claim 12, wherein receiver receives the copy of the certificate from a network element of the service provider and the processor causes the transmitter to transmit the indication that the mobile communications device is authentic to the network element.

17. The server of claim 12, wherein the copy of certificate is received from the mobile communications device.

18. The server of claim 12, wherein the server comprises at least one of a content server, applications server and a messaging server.

* * * * *